April 11, 1950 N. E. WAHLBERG 2,503,893
GEAR SELECTING MECHANISM
Original Filed June 7, 1945
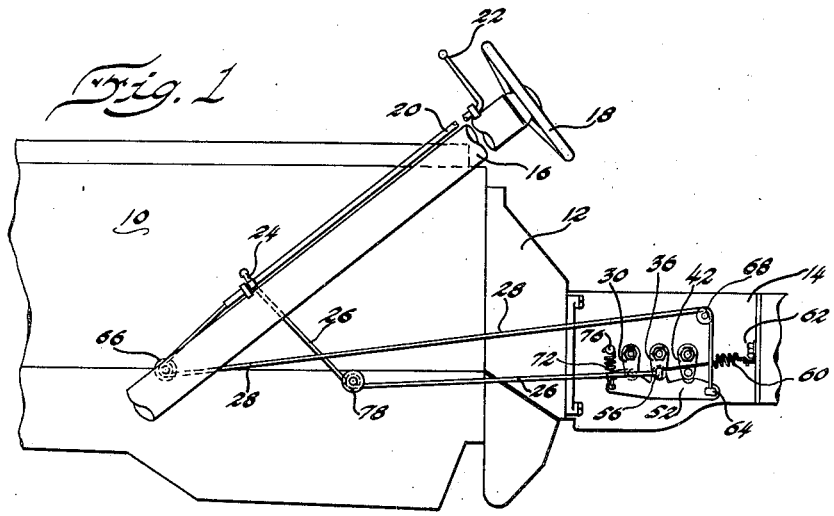
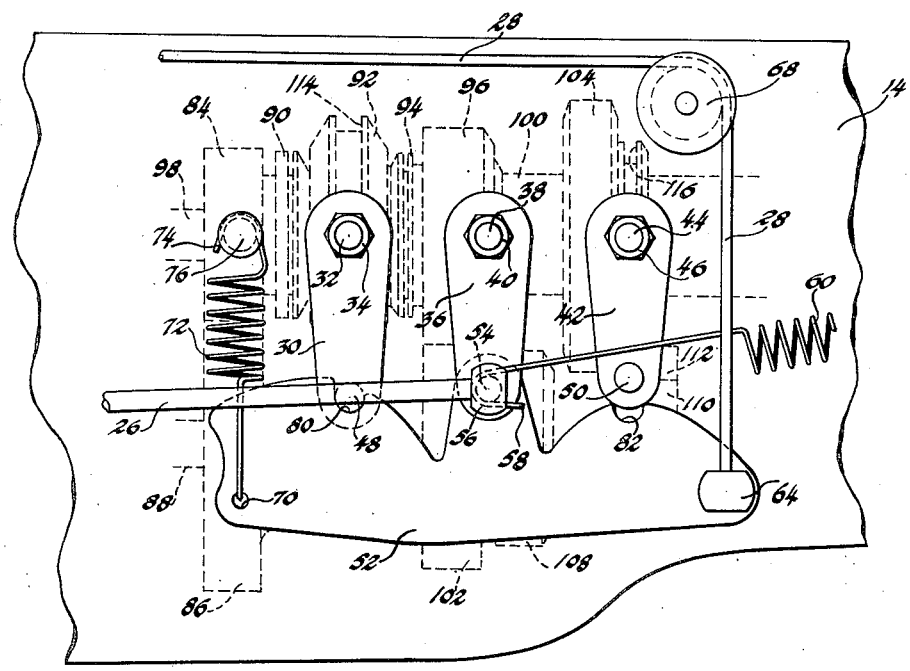
NILS ERIK WAHLBERG
INVENTOR.
BY Carl J. Barbee
HIS ATTORNEY Patented Apr. 11, 1950

2,503,893

UNITED STATES PATENT OFFICE 2,503,893

GEAR SELECTING MECHANISM

Nils Erik Wahlberg, Chicago, Ill., assignor to Nash-Kelvinator Corporation, Kenosha, Wis., a corporation of Maryland Substituted for application Serial No. 598,104, June 7, 1945. This application October 21, 1946, Serial No. 704,719

11 Claims. (Cl. 74—473)

1

This application is an application filed in place of forfeited application Serial No. 598,104, dated June 7, 1945.

This invention relates to remote gear selecting mechanisms and more particularly to a novel arrangement of external gear shifting means located on the side of the transmission of a vehicle.

It is an object of this invention to provide a gear selecting mechanism having flexible linkage means between the shift shaft on the steering post and the transmission rather than the usual rigid links which are often bent or broken by rough use on the part of an automobile operator.

It is a further object of this invention to provide a gear selecting mechanism which will require very little adjustment after assembly as it will be difficult for an operator of the automobile to force the various units of the invention out of their normal operative positions.

It is another object of this invention to provide a gear selecting mechanism wherein a rocker arm is manually controlled and moved to perform all of the shifting operations.

Other objects and advantages of this invention will be apparent from a consideration of the following description, claims and the attached drawings, of which there is one sheet, and in which:

Figure 1 represents a side elevation of an internal combustion engine, clutch housing, transmission case, steering column with a gear shifting mechanism mounted thereon and the invention located on the side of said transmission housing; and Figure 2 represents an enlarged side elevational view of a portion of the transmission case showing the gear selecting mechanism mounted thereon and showing various units of the transmission within said case.

Illustrated in Figure 1 is an internal combustion engine 10 with the usual clutch housing 12 secured thereto and the transmission case 14 secured to said clutch housing 12. In relative operating position to engine 10 is mounted the steering column 16 having the usual hand wheel 18 mounted on its upper end. Carried by column 16 and extending axially thereof is the gear selecting rod 20 having the hand lever 22 mounted on its upper end directly under hand wheel 18. Rod 20 is mounted in an approved manner which allows said rod 20 to be moved axially to a limited degree as lever 22 is moved upwardly by an operator toward wheel 18. Rod 20 is rotated as lever 22 is rotated about the axis of said rod, in which case a lever 24 secured to rod 20 near its lower end will also be rotated around the axis

2 of said rod. A flexible cable 26 is secured to the outer end of lever 24 and a second flexible cable 28 is secured to the lower end of rod 20. Cables 26 and 28 have their other ends secured to various shiftable elements on the side of transmission case 14, which will be described presently.

Flexible steel cables have been found to be extremely strong for their size and weight and it is evident that the harder the auto operator pulls hand lever 22, the straighter he will pull the cables. If metal rods were used as links to the transmission, such a manner of operation would bend said rods out of their normal shape and thus create a maladjustment.

Illustrated in Figure 2 is the novel gear selecting mechanism and cooperable transmission elements. The gear selecting mechanism located on the outside of case 14 is comprised of a first rotatable lever 30 carried by and rigidly secured to rotatable shaft 32 which extends into case 14. Nut 34 is threaded on the outer end of shaft 32 to secure lever 30 thereon. A link 36 is carried by and rotatably secured to bolt 38, which is carried in the side of case 14. Nut 40 is threaded on the outer end of bolt 38 to retain link 36 thereon. A second lever 42 is carried by and rigidly secured to rotatable shaft 44, which, like shaft 32, extends into case 14. Nut 46 is threaded on the outer end of shaft 44 to secure lever 42 thereon. Laterally extending pins 48 and 50 are secured on levers 30 and 42, respectively, near their ends remote from the shafts 32 and 44, respectively.

A pin 54 extends through and is secured within an aperture in link 36 near its end remote from bolt 38. On pin 54 is rotatably secured a rocker arm 52 and a connection means 56 which secures cable 26 to said pin 54. One end 58 of tension spring 60 is hooked over pin 54 and its other end is secured to case 14 as at 62 (Figure 1), thereby imparting rotating energy to pin 54 and link 36 which tends to rotate said pin and link in a counterclockwise direction around the axis of bolt 38. Cable connection means 64 are secured near one end of rocker arm 52 by which cable 28 is secured thereto. Cable 28 extends from its connection to the lower end of shift rod 20 (Figure 1), over a pulley 66 (Figure 1) mounted on steering column 16 (Figure 1), over a pulley 68 mounted on transmission case 14 and thence to connection means 64 on rocker arm 52. It will readily be understood that when cable 28 is pulled by raising lever 22 and rod 20 of Figure 1, rocker arm 52 will be rotated in a counterclockwise direction around the axis of pin 54.

An aperture 70 extends through rocker arm 52 near its end opposite connection 64 and through said aperture extends one end of tension spring 72. The opposite end of spring 72 is hooked over pin 76, which is carried by transmission case 14 and secured in the side thereof. Spring 72 imparts energy to rocker arm 52 tending to rotate said rocker arm in a clockwise direction around the axis of pin 54. This is a counter movement to that described above which is provided by the actuation of rocker arm 52 when cable 28 is pulled.

It will be noted that link 36 is rotatable in clockwise and counterclockwise directions around the axis of bolt 38 in much the same manner as rocker arm 52 is rotated around the axis of pin 54. If hand lever 22 is rotated in a counterclockwise direction about the axis of shaft 20, thus rotating said shaft and lever 24 about said axis in a like direction, cable 26 will be pulled. Clockwise rotation of lever 22, rod 20 and lever 24 will slacken cable 26. Cable 26 travels from lever 24 over pulley 78 (Figure 1) to connection 56 which secures cable 26 to pin 54 which carries rocker arm 52. When cable 26 is pulled by lever 24 (Figure 1), pin 54 and link 36 will be rotated around the axis of bolt 38 in a clockwise direction, carrying rocker arm 52 along. As cable 26 is slackened by a clockwise rotation of lever 24 (Figure 1), tension spring 60 will rotate pin 54 and link 36 in a counterclockwise direction around the axis of bolt 38 and rocker arm 52 will be carried along.

Rocker arm 52 has two partially spherical grooves 80 and 82 in its upper surfaces which are designed to receive pins 48 and 50, respectively. When cable 28 is pulled, thus rotating rocker arm 52 counterclockwise around the axis of pin 54, groove 82 will be raised from its position in Figure 2 to partially encircle pin 50. As cable 28 is slackened, rocker arm 52 will rotate in a clockwise direction due to the strength of spring 72 and groove 80 will engage pin 48 while groove 82 releases pin 50 as shown in Figure 2.

Cooperable elements as shown within the transmission case 14 consist of a driving high speed gear 84 having its outer surface toothed and in constant engagement with gear 86 which is the first gear of the gear train carried by countershaft 88. Gear 84 is integral with a gear 90 which is designed to be engaged by the toothed inner surface of synchronizer collar 92 as said collar is shifted thereover. Collar 92 may also be shifted in the opposite direction into engagement with externally toothed gear 94 which is integral with second speed gear 96. Gears 84 and 90 are formed as a part of drive shaft 98 while collar 92 is secured to the main shaft of the transmission of which splined portion 100 is a part.

Therefore, when collar 92 is shifted to engage gear 90, the main shaft is driven at the same speed as the drive shaft 98. This is commonly called "high gear". Second speed gear 96 floats on the driven shaft and is in constant engagement with the second gear 102 of the gear train carried by countershaft 88. Thus, gears 86, 102, second speed gear 96 and gear 94 are driven at all times by drive gear 84. When collar 92 is shifted to engage gear 94, collar 92 will be driven and so will the main shaft as collar 92 is slidably secured thereto through its engagement with an externally toothed hub (not shown) which is in splined engagement with the main shaft.

Sliding gear 104 is slidably mounted on splined portion 100 of the driven shaft and is designed to engage the low speed gear 108 as gear 104 is moved forwardly. Gear 108 is the third gear on the train. Sliding gear 104 is also designed to engage reverse idler gear 112 as gear 104 is moved rearwardly. Gear 112 is in constant mesh with reverse gear 110, which is the fourth and last gear on the gear train. Thus gear 104 and the driven shaft may be driven in reverse by gear 110 if gear 104 is moved to engage reverse idler gear 112. Gears 86, 102, 108 and 110 are an integral train and thus all are driven at all times when the drive gear 84 is moving as gear 86 is in constant mesh therewith. Gears 94 and 96 likewise will rotate as gear 96 is in constant mesh with gear 102. Collar 92 and slidable gear 104 are the shiftable elements which determine which selective gears will be engaged and thus at what speed ratio the main shaft shall operate.

Shifting forks (not shown) are carried and movable by shafts 32 and 44 on their inner ends. These shifting forks have portions positioned within grooves 114 and 116 of collar 92 and gear 104, respectively, so that movement of a fork will move these shiftable gears.

All the elements of the transmission and selecting means are shown in Figure 2 at neutral positions except rocker arm 52, which has its forward end raised so that groove 80 has engaged pin 48. Cable 28 has been slackened by lowering hand lever 22 and shift rod 20, thus allowing spring 72 to rotate rocker arm 52 in a clockwise direction. As this gear selecting mechanism utilizes the conventional H shift movements, the lever 22 is now in position to be rotated around the axis of rod 20 to engage either second or high speed gears. If lever 22 is rotated clockwise to high gear position, lever 24 will be moved in the same manner and cable 26 will be slackened, allowing spring 60 to rotate link 36 in a counterclockwise direction, in which case lever 30 and shaft 32 will be rotated in the same manner as rocker arm 52 will be carried along with link 36 and will rotate lever 30 as groove 80 is in engagement with pin 48 of said lever 30. This rotation of shaft 32 will move the shift fork (not shown) on its inner end in a forward direction, thus shifting collar 92 forward to engage high gear 90.

If lever 22 is rotated in a counterclockwise direction to engage second gear, lever 24 will pull cable 26, thus rotating link 36 in a clockwise direction and rocker arm 52 will then rotate lever 30 and shaft 32 in a like direction and collar 92 within the transmission case 14 will be moved rearwardly to engage second gear 94.

If the operator wishes to engage low or reverse gear, he would move the lever 22 to neutral position, raise said lever toward hand wheel 18, thus pulling rod 20 and cable 28. Rocker arm 52 would thus be rotated in a counterclockwise direction so that groove 82 would engage pin 50 and groove 80 would disengage pin 48. From this position, either low or reverse gear can be engaged. If handle 20 is rotated clockwise, cable 26 will be slackened, spring 60 will rotate link 36 in a counterclockwise direction and through rocker arm 52, lever 42 and shaft 44 will be rotated in a like manner. The shift fork (not shown) on the inner end of shaft 44 which is partially positioned within groove 116 of gear 140 will be moved forward, thus moving gear 104 forward into engagement with gear 108, which is low speed gear. If lever 22 is moved in a counterclockwise direction, cable 26 will be pulled by lever 24, thus rotating link 36, lever 42 and shaft 44 in a clockwise direction and gear 104 will be moved rearwardly to engage reverse idler gear 112 and thus be driven in reverse.

In the manner described above, applicant has invented a gear selecting mechanism that is operated by flexible cable links, thus providing such a mechanism which cannot reach a maladjusted condition as a flexible cable can be easily pulled back to its original form.

While I have described my invention in some detail, I intend this description to be an example only and not limiting on my invention, to which I make the following claims:

1. In a power transmission, a gear selecting mechanism comprising a first lever, means within said transmission movable by said first lever, a second lever, means within said transmission movable by said second lever, a link, rotatable means carried by said link designed to selectively engage said first or second lever to form a connection with said link, manually controlled means to rotate said link in one direction, means to rotate said link in the opposite direction, manually controlled means to rotate the means carried by said link in one direction, and resilient means to rotate said means in the opposite direction.

2. In a power transmission, a plurality of shiftable members, a plurality of levers associated therewith for shifting the same to thereby effect speed ratio changes in said transmission, a rotatable link secured to said transmission, a rotatable rocker arm carried by said link to selectively engage said levers, means exerting force tending to rotate said link in one direction, manually controlled means to rotate said link in the opposite direction, means exerting force tending to rotate said rocker arm to engage one of said levers, and manually controlled means to rotate said rocker arm to engage another of said levers.

3. In a power transmission, a plurality of shiftable members, a pair of rotatable levers associated therewith for moving the same to thereby effect speed ratio changes in said transmission, a pin carried by each of said levers, a rotatable link secured to said transmission, a rotatable rocker arm carried by said link, means on said rocker arm to engage said pins, means secured to said link tending to rotate same in one direction, manually controlled means connected to said link to rotate same in the opposite direction, means secured to said rocker arm tending to rotate same in one direction, and manually controlled means tending to rotate said rocker arm in the opposite direction.

4. In a power transmission, a plurality of shiftable members, a pair of rotatable levers associated therewith for moving the same to thereby effect speed ratio changes in said transmission, a rotatable link secured between said levers, a rocker arm carried by said link, means secured to each of said levers selectively engageable by said rocker arm, resilient means to rotate said rocker arm in one direction, manually controlled means to rotate said rocker arm in the opposite direction, resilient means to rotate said link in one direction, and manually controlled means to rotate said link in the opposite direction.

5. In a power transmission, a plurality of shiftable members, a pair of rotatable levers associated therewith for moving the same to thereby effect speed ratio changes in said transmission, a pair of pins, one of which is carried by each of said levers, a rotatable link secured between said levers, a rotatable rocker arm carried by said link, means on said rocker arm to engage said pins, resilient means secured to said rocker arm to rotate said rocker arm in one direction to move said means on said rocker arm into engagement with one of said pins, manually controlled means connected to said rocker arm to rotate said rocker arm in the opposite direction to move the other of said means on said rocker arm into engagement with the other of said pins, resilient means secured to said link to rotate the same in one direction, and manually controlled means to rotate said link in the opposite direction.

6. A gear selecting mechanism for a power transmission comprising a plurality of shiftable elements, a plurality of rotatable levers associated therewith for moving the same to thereby effect ratio changes in said transmission, a first rotatable link, a rocker arm carried by said link, a steering column, a reciprocable and rotatable shifting shaft, a hand lever secured on one end of said shaft, a lever rigidly secured near the other end of said shaft and rotatable around the axis thereof, a second link having its one end secured to the lever on the shift shaft and its other end secured to said first link, a third link having its one end secured to the end of said shaft remote from said hand lever and its other end secured to said rocker arm, a first means to rotate said first link in one direction, and a second means to rotate said rocker arm in one direction.

7. A gear selecting mechanism for a power transmission comprising a manually reciprocable and rotatable shift shaft, a hand lever mounted on one end of said shaft, a plurality of shiftable elements, a plurality of rotatable levers associated therewith for moving said elements to thereby effect ratio changes in said transmission, a rotatable link, a rocker arm carried by said link to selectively engage said levers, a shift lever secured on said shift shaft near its end remote from the hand lever, a link having one end secured to said remote end of the shift shaft and its other end secured to said rocker arm to rotate same when said shaft is reciprocated upwardly, and a second link having one of its ends secured to said shift lever and its other end secured to said rotatable link to rotate the same when said shift lever is manually rotated.

8. In a gear selecting mechanism for a power transmission, a shift rod manually movable along and rotatable about its axis, a hand lever secured to one end of said rod, a plurality of shiftable elements in said transmission, a plurality of rotatable levers associated therewith for moving said elements to thereby effect ratio changes in said transmission, a shift lever secured near the end of said rod remote from said hand lever, a rotatable link, a rocker arm carried by said link which selectively engages said rotatable levers for rotation thereof, resilient means secured to said rocker arm to rotate the same to engage one of said rotatable levers, manually controlled means secured to said link to rotate the same to engage another of said rotatable levers, resilient means secured to said rotatable link to rotate same in one direction, and manually controlled means secured to said link to rotate the same in the opposite direction.

9. In a gear selecting mechanism for a power transmission, a shift rod manualy movable along and rotatable about its axis, a hand lever secured to the upper end of said rod, a shift lever secured near the lower end of said rod and rotated around the axis thereof as said rod is rotated, a first cable secured to the lower end of said rod, a second cable secured to the outer end of said shift lever, a plurality of shiftable elements within said transmission, a plurality of rotatable levers associated therewith for moving said elements to thereby effect ratio changes in said transmission, a rotatable link carried by said transmission, a rocker arm carried by said link and designed to selectively engage said levers, resilient means secured to said rocker arm for rotating the same in one direction, said first cable secured to said rocker arm to rotate the same in the opposite direction as it is pulled when the shift rod is pulled upwardly along its axis, resilient means secured to said link to rotate the same in one direction, and said second cable secured to said link to rotate the same in the opposite direction as said cable is pulled when the shift lever is rotated.

10. In a gear selecting mechanism for a power transmission, a plurality of shiftable elements, a pair of rotatable levers associated therewith for moving the same to thereby effect speed ratio changes in said transmission, a pin carried by each of said levers, a rotatable link positioned between said levers, a rocker arm carried by said link to selectively engage said pins, manually controlled means for said mechanism comprising a steering column, a rotatable shifting rod movable along said column and carried thereby, a hand lever secured on the upper end of said rod for actuation thereof, a lever secured to said rod near its lower end for rotation thereby, a cable having one of its ends secured to the lower end of said rod and having its other end secured to the rocker arm for rotation thereof in one direction, resilient means secured to said rocker arm for rotation thereof in the opposite direction, a second cable having one end secured to the end of the lever which is secured to said link for rotation thereof in one direction, and resilient means secured to said link for rotation thereof in the opposite direction.

11. In a gear selecting mechanism for a power transmission, a plurality of shiftable elements in said transmission, a pair of external rotatable levers associated therewith for moving the same to thereby effect speed ratio changes in said transmission, a pin carried by each of said levers, a rotatable link positioned between said levers, a rocker arm to selectively engage said pins, a first resilient means for rotation of said link in one direction, a second resilient means for rotation of said rocker arm in one direction, manually controlled means for rotating said link and rocker arm in directions opposite to those imposed by the said resilient means associated therewith and comprising a steering column, a rotatable rod carried by said column and movable along its axis, a hand lever secured to the upper end of said rod for rotation thereof, a lever secured to said rod near the lower end and rotatable thereby, a cable secured to said lever and to the link on the transmission forming a linkage therebetween for rotation of said link when the lever is rotated in one direction, and a cable secured to the lower end of the rod and to the rocker arm, thereby forming a linkage therebetween for rotating said rocker arm when said rod is pulled upwardly.

NILS ERIK WAHLBERG.

REFERENCES CITED

The following references are of record in the file of this patent:

UNITED STATES PATENTS

| Number | Name | Date |
|---|---|---|
| 2,193,218 | Best | Mar. 12, 1940 |
| 2,202,950 | Girardi | June 4, 1940 |
| 2,309,837 | Fishburn | Feb. 2, 1943 |
| 2,342,138 | Gilfillan | Feb. 22, 1944 |